(12) United States Patent
Wheatley, III et al.

(10) Patent No.: US 9,275,791 B2
(45) Date of Patent: Mar. 1, 2016

(54) SYSTEMS AND METHODS FOR DECOUPLING MULTIPLE WIRELESS CHARGING TRANSMITTERS

(71) Applicant: QUALCOMM Incorporated, San Diego, CA (US)

(72) Inventors: Charles Edward Wheatley, III, Del Mar, CA (US); Zhen Ning Low, San Diego, CA (US); Meng Li, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 421 days.

(21) Appl. No.: 13/841,177

(22) Filed: Mar. 15, 2013

(65) Prior Publication Data

US 2014/0062213 A1    Mar. 6, 2014

Related U.S. Application Data

(60) Provisional application No. 61/696,032, filed on Aug. 31, 2012.

(51) Int. Cl.
*H01F 38/14*     (2006.01)
*H02J 5/00*      (2006.01)
*H04B 5/00*      (2006.01)
*H02J 17/00*     (2006.01)
*H01F 27/42*     (2006.01)

(52) U.S. Cl.
CPC ............... *H01F 38/14* (2013.01); *H02J 5/005* (2013.01); *H02J 17/00* (2013.01); *H04B 5/0037* (2013.01)

(58) Field of Classification Search
USPC ....................................................... 307/104
See application file for complete search history.

(56) References Cited

U.S. PATENT DOCUMENTS

| 8,338,991 | B2 | 12/2012 | Von Novak et al. |
| 8,952,572 | B2 | 2/2015 | De Boodt |
| 2007/0145830 | A1 | 6/2007 | Lee et al. |
| 2010/0109444 | A1 | 5/2010 | Lemmens |
| 2012/0050931 | A1 | 3/2012 | Terry et al. |
| 2012/0161535 | A1 | 6/2012 | Jung et al. |
| 2012/0223595 | A1 | 9/2012 | Oodachi et al. |

FOREIGN PATENT DOCUMENTS

| EP | 2211438 A1 | 7/2010 |
| JP | 2011199975 A | 10/2011 |

(Continued)

OTHER PUBLICATIONS

International Search Report and Written Opinion—PCT/US2013/056836—ISA/EPO—Mar. 3, 2014.

(Continued)

*Primary Examiner* — Robert Deberadinis
(74) *Attorney, Agent, or Firm* — Knobbe, Martens, Olson & Bear, LLP (57) ABSTRACT

This disclosure provides systems, methods and apparatus for decoupling multiple wireless charging transmitters. In one aspect, a device is configured to transmit wireless power to a first receiver. The device includes a first driver coil and a second driver coil. The device further includes a common reactance element connected to the first driver coil and the second driver coil. The reactance element is configured to at least partially cancel mutual inductance between the first driver coil and the second driver coil.

40 Claims, 8 Drawing Sheets

(56) References Cited

FOREIGN PATENT DOCUMENTS

| TW | 201015821 A | 4/2010 |
|---|---|---|
| TW | 201106572 A | 2/2011 |
| TW | 201143251 A | 12/2011 |

OTHER PUBLICATIONS

Judd F, "Circular and Square Loop Antennas", Practical Wireless, P W Publishing, Dorset, GB, vol. 66, No. 12, Dec. 1, 1990, pp. 38-42, XP009041413, ISSN: 0141-0857.

Partial International Search Report—PCT/US2013/056836—ISA/EPO—Dec. 2, 2013.

Takamiya M., et al., "Design for Mixed Circuits of Organic FETs and Plastic MEMS Switches for Wireless Power Transmission Sheet", Integrated Circuit Design and Technology, 2007. ICICDT '07. IEEE International Conference on, IEEE, Pl, May 1, 2007, pp. 1-4, XP031132716, ISBN: 978-1-4244-0756-9.

Wu B, et al., "Tunable Loop Microstrip (TLM) Coil Array With Decoupling Capacitors", The HKU Scholars Hub, Sep. 25, 2010, XP055085225, HK; 1 page; Retrieved from the Internet: URL:http:f/hdl.handle.net/10722/99002 [retrieved on Oct. 24, 2013].

Taiwan Search Report—TW102131388—TIPO—Apr. 15, 2015.

SYSTEMS AND METHODS FOR DECOUPLING MULTIPLE WIRELESS CHARGING TRANSMITTERS

CROSS-REFERENCE TO RELATED APPLICATIONS

This application claims the benefit of U.S. Provisional Patent application Ser. No. 61/696,032 entitled "Systems and Methods for Decoupling Multiple Wireless Charging Transmitters" which was filed Aug. 31, 2012. The entirety of the aforementioned application is herein incorporated by reference.

FIELD

The present invention relates generally to wireless power. More specifically, the disclosure is directed to wireless power systems having multiple decoupled transmitters.

BACKGROUND

An increasing number and variety of electronic devices are powered via rechargeable batteries. Such devices include mobile phones, portable music players, laptop computers, tablet computers, computer peripheral devices, communication a devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors can sometimes be inconvenient or cumbersome and have other drawbacks. Wireless charging systems that are capable of transferring power in free space to be used to charge rechargeable electronic devices or provide power to electronic devices can overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

One aspect of the disclosure provides a device configured to transmit wireless power to a first receiver. The device includes a first driver coil and a second driver coil. The device further includes a common reactance element connected to the first driver coil and the second driver coil. The reactance element is configured to at least partially cancel mutual inductance between the first driver coil and the second driver coil.

Another aspect of the subject matter described in the disclosure provides a method of transmitting wireless power to a first receiver. The method includes determining, at a transmitter including a first driver coil and a second driver coil, a position of the first receiver. The method further includes transmitting wireless power to the first receiver. The method further includes adjusting a characteristic of the first driver coil and/or a second driver coil, based on the position of the first receiver. The transmitter further includes a common reactance element connected to the first driver coil and the second driver coil. The reactance element is configured to at least partially cancel mutual inductance between the first driver coil and the second driver coil.

Another aspect of the subject matter described in the disclosure provides an apparatus for transmitting wireless power to a first receiver. The apparatus includes first means for transmitting wireless power. The apparatus further includes second means for transmitting wireless power. The apparatus further includes means for at least partially decoupling the first means for transmitting wireless power and the second means for transmitting wireless power.

Another aspect of the subject matter described in the disclosure provides a non-transitory computer-readable medium including code that, when executed, causes an apparatus to transmit wireless power, from a transmitter to a first receiver. The transmitter includes a first driver coil, a second driver coil, and a common reactance element connected to the first driver coil and the second driver coil. The reactance element is configured to at least partially cancel mutual inductance between the first driver coil and the second driver coil. The medium further includes code that, when executed, causes the apparatus to determine a position of the first receiver. The medium further includes code that, when executed, causes the apparatus to adjust a characteristic of the first driver coil and/or a second driver coil, based on the determined position of the first receiver.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

The various features illustrated in the drawings may not be drawn to scale. Accordingly, the dimensions of the various features can be arbitrarily expanded or reduced for clarity. In addition, some of the drawings may not depict all of the components of a given system, method or device. Finally, like reference numerals can be used to denote like features throughout the specification and figures.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power can refer to transferring any form of energy associated with electric fields, magnetic fields, electromagnetic fields, or otherwise from a transmitter to a receiver without the use of physical electrical conductors (e.g., power can be transferred through free space). The power output into a wireless field (e.g., a magnetic field) can be received, captured by, or coupled by a "receiving coil" to achieve power transfer.

Figure 1:
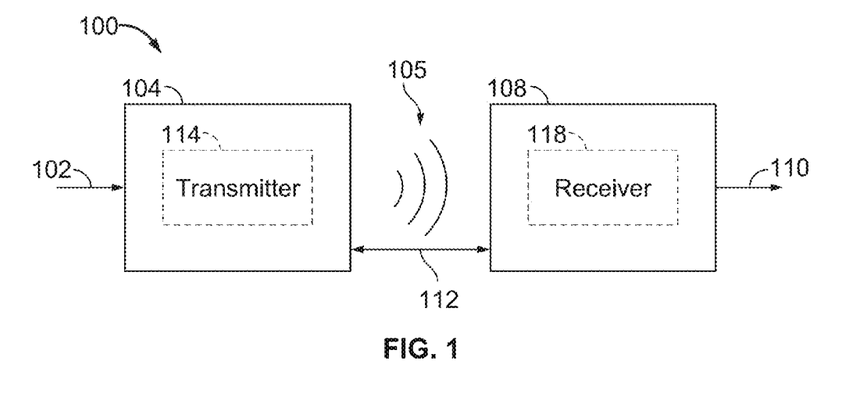
FIG. 1 is a functional block diagram of an exemplary wireless power transfer system, in accordance with exemplary embodiments of the invention.

FIG. 1 is a functional block diagram of an exemplary wireless power transfer system 100, in accordance with exemplary embodiments of the invention. Input power 102 can be provided to a transmitter 104 from a power source (not shown) for generating a field 105 for providing energy transfer. A receiver 108 can couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer can be provided over larger distance in contrast to purely inductive solutions that can require large coils that require coils to be very close (e.g., mms). Resonant inductive coupling techniques can thus allow for improved efficiency and power transfer over various distances and with a variety of inductive coil configurations.

The receiver 108 can receive power when the receiver 108 is located in an energy field 105 produced by the transmitter 104. The field 105 corresponds to a region where energy output by the transmitter 104 can be captured by a receiver 105. In some cases, the field 105 can correspond to the "near-field" of the transmitter 104 as will be further described below. The transmitter 104 can include a transmit coil 114 for outputting an energy transmission. The receiver 108 further includes a receive coil 118 for receiving or capturing energy from the energy transmission. The near-field can correspond to a region in which there are strong reactive fields resulting from the currents and charges in the transmit coil 114 that minimally radiate power away from the transmit coil 114. In some cases the near-field can correspond to a region that is within about one wavelength (or a fraction thereof) of the transmit coil 114. The transmit and receive coils 114 and 118 are sized according to applications and devices to be associated therewith. As described above, efficient energy transfer can occur by coupling a large portion of the energy in a field 105 of the transmit coil 114 to a receive coil 118 rather than propagating most of the energy in an electromagnetic wave to the far field. When positioned within the field 105, a "coupling mode" can be developed between the transmit coil 114 and the receive coil 118. The area around the transmit and receive coils 114 and 118 where this coupling can occur is referred to herein as a coupling-mode region.

Figure 2:
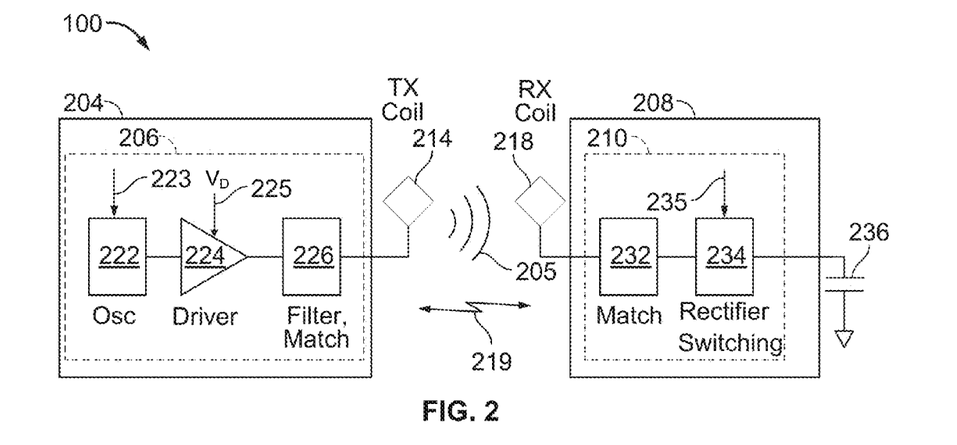
FIG. 2 is a functional block diagram of exemplary components that can be used in the wireless power transfer system of FIG. 1, in accordance with various exemplary embodiments of the invention.

FIG. 2 is a functional block diagram of exemplary components that can be used in the wireless power transfer system 100 of FIG. 1, in accordance with various exemplary embodiments of the invention. The transmitter 204 can include transmit circuitry 206 that can include an oscillator 222, a driver circuit 224, and a filter and matching circuit 226. The oscillator 222 can be configured to generate a signal at a desired frequency, such as 468.75 KHz, 6.78 MHz or 13.56 MHz, that can be adjusted in response to a frequency control signal 223. The oscillator signal can be provided to a driver circuit 224 configured to drive the transmit coil 214 at, for example, a resonant frequency of the transmit coil 214. The driver circuit 224 can be a switching amplifier configured to receive a square wave from the oscillator 222 and output a sine wave. For example, the driver circuit 224 can be a class E amplifier. A filter and matching circuit 226 can be also included to filter out harmonics or other unwanted frequencies and match the impedance of the transmitter 204 to the transmit coil 214.

The receiver 208 can include receive circuitry 210 that can include a matching circuit 232 and a rectifier and switching circuit 234 to generate a DC power output from an AC power input to charge a battery 236 as shown in FIG. 2 or to power a device (not shown) coupled to the receiver 108. The matching circuit 232 can be included to match the impedance of the receive circuitry 210 to the receive coil 218. The receiver 208 and transmitter 204 can additionally communicate on a separate communication channel 219 (e.g., Bluetooth, zigbee, cellular, etc). The receiver 208 and transmitter 204 can alternatively communicate via in-band signaling using characteristics of the wireless field 206.

As described more fully below, receiver 208, that can initially have a selectively disableable associated load (e.g., battery 236), can be configured to determine whether an amount of power transmitted by transmitter 204 and received by receiver 208 is appropriate for charging a battery 236. Further, receiver 208 can be configured to enable a load (e.g., battery 236) upon determining that the amount of power is appropriate. In some embodiments, a receiver 208 can be configured to directly utilize power received from a wireless power transfer field without charging of a battery 236. For example, a communication a device, such as a near-field communication (NFC) or radio-frequency identification a device (RFID can be configured to receive power from a wireless power transfer field and communicate by interacting with the wireless power transfer field and/or utilize the received power to communicate with a transmitter 204 or other devices.

Figure 3:
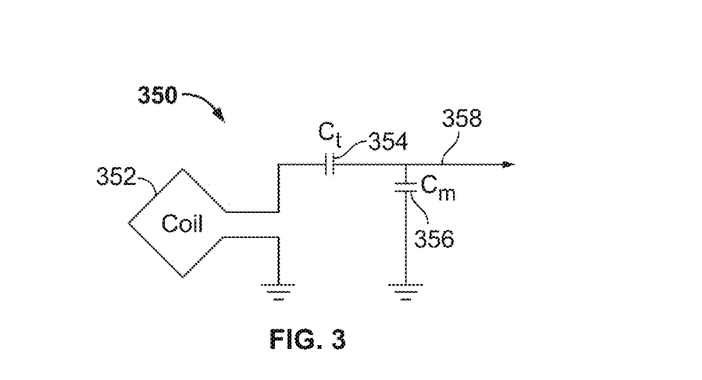
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments can include a coil 352. The coil can also be referred to or be configured as a "loop" antenna 352. The coil 352 can also be referred to herein or be configured as a "magnetic" antenna or an induction coil. The term "coil" is intended to refer to a component that can wirelessly output or receive energy for coupling to another "coil." The coil can also be referred to as an "antenna" of a type that is configured to wirelessly output or receive power. The coil 352 can be configured to include an air core (not shown) or a physical core such as a ferrite core. Ferrite core loop coils can be more tolerable to extraneous physical devices placed in the vicinity of the core. On the other hand, an air core loop coil can allow placement of other components within the core area.

As stated, efficient transfer of energy between the transmitter 104 and receiver 108 can occur during matched or nearly matched resonance between the transmitter 104 and the receiver 108. However, even when resonance between the transmitter 104 and receiver 108 are not matched, energy can be transferred, although the efficiency can be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance can be simply the inductance created by the coil 352, whereas, capacitance can be added to the coil's inductance to create a resonant structure at a desired resonant frequency. As a non-limiting example, capacitor 352 and capacitor 354 can be added to the transmit or receive circuitry 350 to create a resonant circuit that selects a signal 356 at a resonant frequency. Accordingly, for larger diameter coils, the size of capacitance needed to sustain resonance can decrease as the diameter or inductance of the loop increases. Furthermore, as the diameter of the coil increases, the efficient energy transfer area of the near-field can increase. Other resonant circuits formed using other components are also possible. As another non-limiting example, a capacitor can be placed in parallel between the two terminals of the coil 350. For transmit coils, a signal 358 with a frequency that substantially corresponds to the resonant frequency of the coil 352 can be an input to the coil 352.

In one embodiment, the transmitter 104 can be configured to output a time varying magnetic field with a frequency corresponding to the resonant frequency of the transmit coil 114. When the receiver is within the field 105, the time varying magnetic field can induce a voltage across the receive coil 118. As described above, if the receive coil 118 is configured to be resonant at the frequency of the transmit coil 114, energy can be efficiently transferred. The AC signal induced in the receive coil 118 can be rectified as described above to produce a DC signal that can be provided to charge or to power a load.

Figure 4:
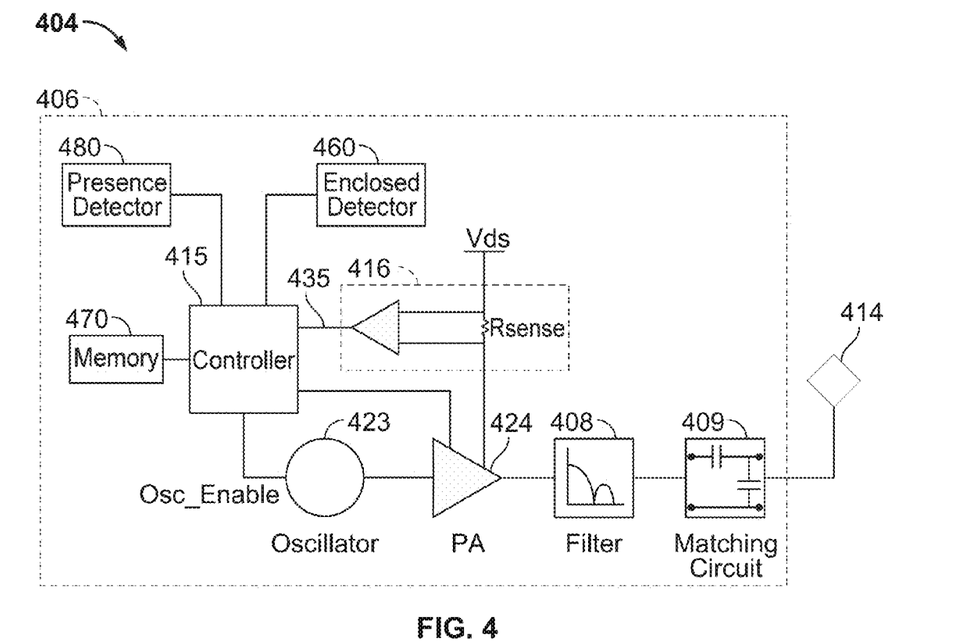
FIG. 4 is a functional block diagram of a transmitter that can be used in the wireless power transfer system of FIG. 1, in accordance with exemplary embodiments of the invention.

FIG. 4 is a functional block diagram of a transmitter 404 that can be used in the wireless power transfer system of FIG. 1, in accordance with exemplary embodiments of the invention. The transmitter 404 can include transmit circuitry 406 and a transmit coil 414. The transmit coil 414 can be the coil 352 as shown in FIG. 3. Transmit circuitry 406 can provide RF power to the transmit coil 414 by providing an oscillating signal resulting in generation of energy (e.g., magnetic flux) about the transmit coil 414. Transmitter 404 can operate at any suitable frequency. By way of example, transmitter 404 can operate at the 13.56 MHz ISM band.

The transmit circuitry 406 can include a fixed impedance matching circuit 409 for presenting a load to the driver 424 such that the efficiency of power transfer from DC to AC is increased or maximized. The transmit circuitry 406 can further include a low pass filter (LPF) 408 configured to reduce harmonic emissions to levels to prevent self-jamming of devices coupled to receivers 108 (FIG. 1). Other exemplary embodiments can include different filter topologies, including but not limited to, notch filters that attenuate specific frequencies while passing others and can include an adaptive impedance match, that can be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 can be comprised of discrete devices or circuits, or alternately, can be comprised of an integrated assembly. An exemplary RF power output from transmit coil 414 can be around 1 Watt-10 Watts, such as around 2.5 Watts.

Transmit circuitry 406 can further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 can also be referred to herein as processor 415. Adjustment of oscillator phase and related circuitry in the transmission path can allow for reduction of out of band emissions, especially when transitioning from one frequency to another.

The transmit circuitry 406 can further include a load sensing circuit 416 for detecting the presence or absence of active receivers in the vicinity of the near-field generated by transmit coil 414. By way of example, a load sensing circuit 416 monitors the current flowing to the driver circuit 424, that can be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 can be used to determine whether an invalid device is positioned within a wireless power transfer region of the transmitter 404.

The transmit coil 414 can be implemented with a Litz wire or as an antenna strip with the thickness, width and metal type selected to keep resistive losses low. In a one implementation, the transmit coil 414 can generally be configured for association with a larger structure such as a table, mat, lamp or other less portable configuration. Accordingly, the transmit coil 414 generally may not need "turns" in order to be of a practical dimension. An exemplary implementation of a transmit coil 414 can be "electrically small" (i.e., fraction of the wavelength) and tuned to resonate at lower usable frequencies by using capacitors to define the resonant frequency.

The transmitter 404 can gather and track information about the whereabouts and status of receiver devices that can be associated with the transmitter 404. Thus, the transmit circuitry 406 can include a presence detector 480, an enclosed detector 460, or a combination thereof, connected to the controller 415 (also referred to as a processor herein). The controller 415 can adjust an amount of power delivered by the driver circuit 424 in response to presence signals from the presence detector 480 and the enclosed detector 460. The transmitter 404 can receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 can be a motion detector utilized to sense the initial presence of a device to be charged that is inserted into the coverage area of the transmitter 404. After detection, the transmitter 404 can be turned on and the RF power received by the device can be used to toggle a switch on the Rx device in a pre-determined manner, which in turn results in changes to the driving point impedance of the transmitter 404.

As another non-limiting example, the presence detector 480 can be a detector capable of detecting a human, for example, by infrared detection, motion detection, or other suitable means. In some exemplary embodiments, there can be regulations limiting the amount of power that a transmit coil 414 can transmit at a specific frequency. In some cases, these regulations are meant to protect humans from electromagnetic radiation. However, there can be environments where a transmit coil 414 is placed in areas not occupied by humans, or occupied infrequently by humans, such as, for example, garages, factory floors, shops, and the like. If these environments are free from humans, it can be permissible to increase the power output of the transmit coil 414 above the normal power restrictions regulations. In other words, the controller 415 can adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (can also be referred to herein as an enclosed compartment detector or an enclosed space detector) can be a device such as a sense switch for determining when an enclosure is in a closed or open state. When a transmitter is in an enclosure that is in an enclosed state, a power level of the transmitter can be increased.

In exemplary embodiments, a method by which the transmitter 404 does not remain on indefinitely can be used. In this case, the transmitter 404 can be programmed to shut off after a user-determined amount of time. This feature prevents the transmitter 404, notably the driver circuit 424, from running long after the wireless devices in its perimeter are fully charged. This event can be due to the failure of the circuit to detect the signal sent from either the repeater or the receive coil that a device is fully charged. To prevent the transmitter 404 from automatically shutting down if another device is placed in its perimeter, the transmitter 404 automatic shut off feature can be activated only after a set period of lack of motion detected in its perimeter. The user can be able to determine the inactivity time interval, and change it as desired. As a non-limiting example, the time interval can be longer than that needed to fully charge a specific type of wireless device under the assumption of the device being initially fully discharged.

Figure 5:
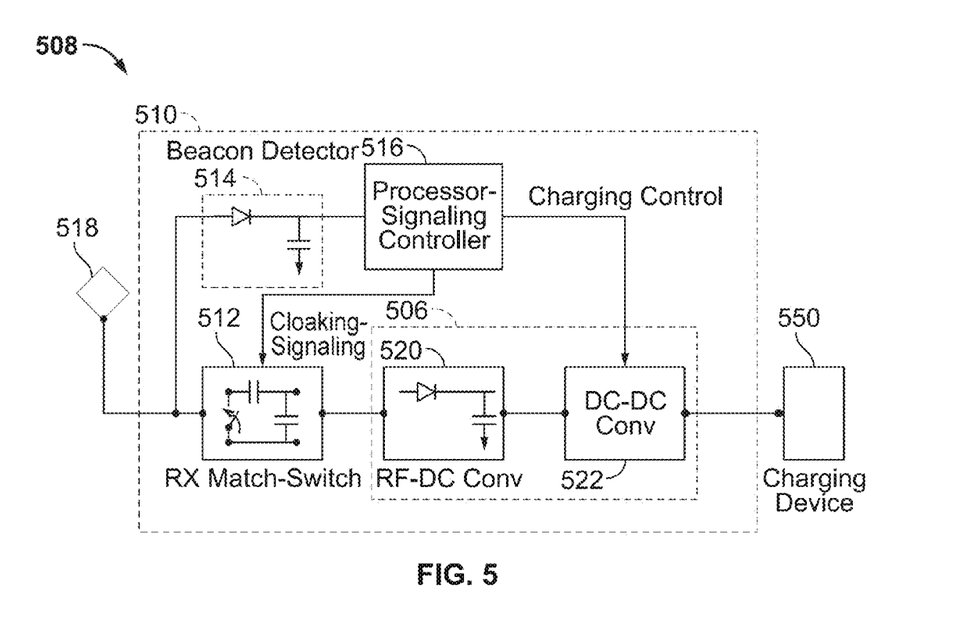
FIG. 5 is a functional block diagram of a receiver that can be used in the wireless power transfer system of FIG. 1, in accordance with exemplary embodiments of the invention.

FIG. 5 is a functional block diagram of a receiver 508 that can be used in the wireless power transfer system of FIG. 1, in accordance with exemplary embodiments of the invention. The receiver 508 includes receive circuitry 510 that can include a receive coil 518. Receiver 508 further couples to device 550 for providing received power thereto. It should be noted that receiver 508 is illustrated as being external to device 550 but can be integrated into device 550. Energy can be propagated wirelessly to receive coil 518 and then coupled through the rest of the receive circuitry 510 to device 550. By way of example, the charging device can include devices such as mobile phones, portable music players, laptop computers, tablet computers, computer peripheral devices, communication a devices (e.g., Bluetooth devices), digital cameras, hearing aids (an other medical devices), and the like.

Receive coil 518 can be tuned to resonate at the same frequency, or within a specified range of frequencies, as transmit coil 414 (FIG. 4). Receive coil 518 can be similarly dimensioned with transmit coil 414 or can be differently sized based upon the dimensions of the associated device 550. By way of example, device 550 can be a portable electronic device having diametric or length dimension smaller than the diameter or length of transmit coil 414. In such an example, receive coil 518 can be implemented as a multi-turn coil in order to reduce the capacitance value of a tuning capacitor (not shown) and increase the receive coil's impedance. By way of example, receive coil 518 can be placed around the substantial circumference of device 550 in order to maximize the coil diameter and reduce the number of loop turns (i.e., windings) of the receive coil 518 and the inter-winding capacitance.

Receive circuitry 510 can provide an impedance match to the receive coil 518. Receive circuitry 510 includes power conversion circuitry 506 for converting a received RF energy source into charging power for use by the device 550. Power conversion circuitry 506 includes an RF-to-DC converter 520 and can also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 can further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that can detect fluctuations in the bias current provided to transmitter driver circuit 424. Accordingly, transmitter 404 has a mechanism for determining when receivers are present in the transmitter's near-field.

In some embodiments, a receiver 508 can be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 can provide a communication mechanism from receiver 508 to transmitter 404 as is explained more fully below. Additionally, a protocol can be associated with the switching that enables the sending of a message from receiver 508 to transmitter 404. By way of example, a switching speed can be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 can use on/off keying of the transmitted signal to adjust whether energy is available in the near-field. The receiver can interpret these changes in energy as a message from the transmitter 404. From the receiver side, the receiver 508 can use tuning and de-tuning of the receive coil 518 to adjust how much power is being accepted from the field. In some cases, the tuning and de-tuning can be accomplished via the switching circuitry 512. The transmitter 404 can detect this difference in power used from the field and interpret these changes as a message from the receiver 508. It is noted that other forms of modulation of the transmit power and the load behavior can be utilized.

Receive circuitry 510 can further include signaling detector and beacon circuitry 514 used to identify received energy fluctuations, that can correspond to informational signaling from the transmitter to the receiver. Furthermore, signaling and beacon circuitry 514 can also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 can also occur upon the occurrence of other events including detection of an external wired charging source (e.g., wall/USB power) providing charging power to device 550. Processor 516, in addition to controlling the cloaking of the receiver, can also monitor beacon circuitry 514 to determine a beacon state and extract messages sent from the transmitter 404. Processor 516 can also adjust the DC-to-DC converter 522 for improved performance.

Figure 6:
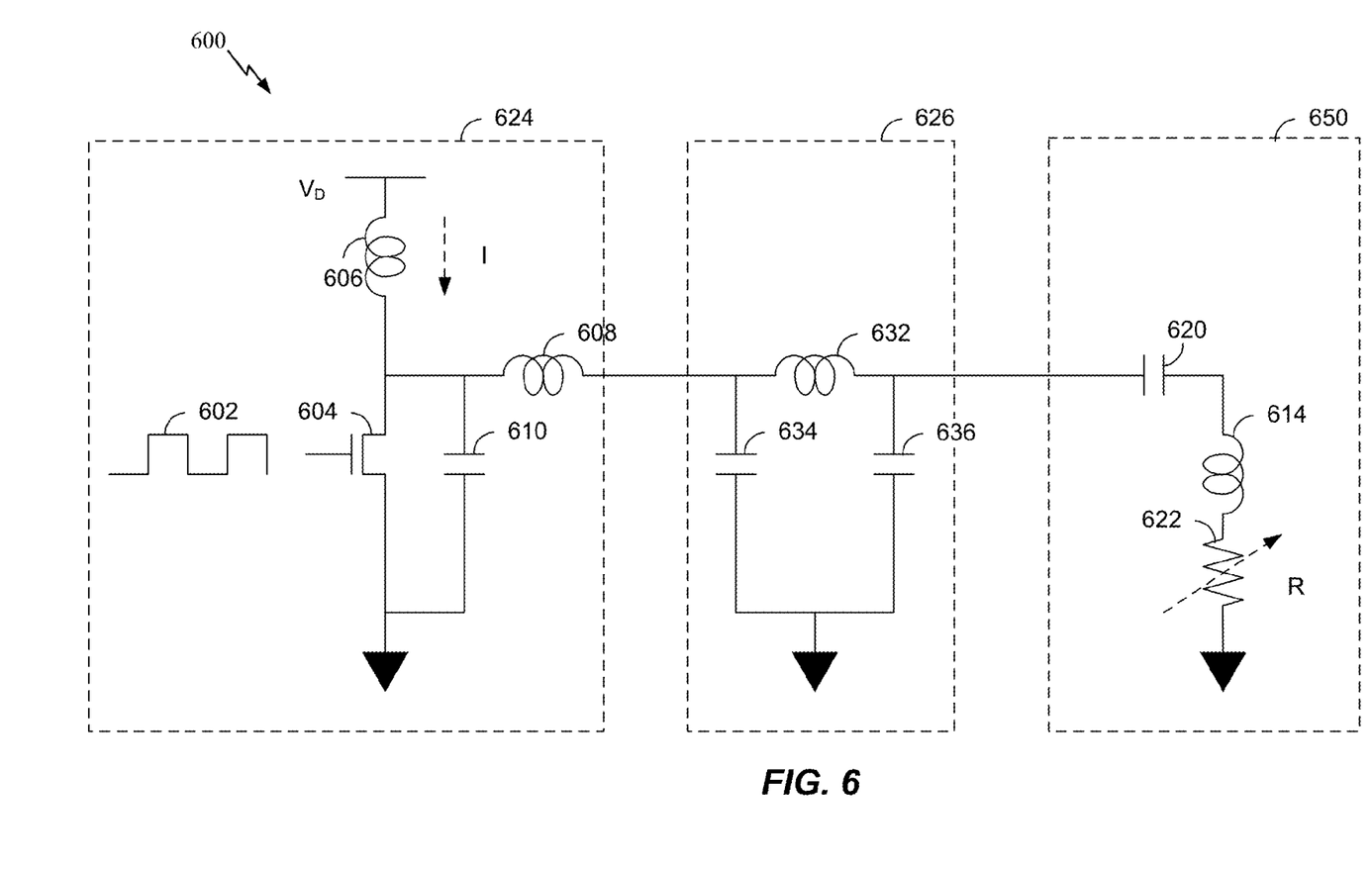
FIG. 6 is a schematic diagram of a portion of transmit circuitry that can be used in the transmit circuitry of FIG. 4.

FIG. 6 is a schematic diagram of a portion of transmit circuitry 600 that can be used in the transmit circuitry 406 of FIG. 4. The transmit circuitry 600 can include a driver circuit 624 as described above in FIG. 4. As described above, the driver circuit 624 can be a switching amplifier that can be configured to receive a square wave and output a sine wave to be provided to the transmit circuit 650. In some cases the driver circuit 624 can be referred to as an amplifier circuit. The driver circuit 624 is shown as a class E amplifier; however, any suitable driver circuit 624 can be used in accordance with embodiments of the invention. The driver circuit 624 can be driven by an input signal 602 from an oscillator 423 as shown in FIG. 4. The driver circuit 624 can also be provided with a drive voltage $V_D$ that is configured to control the maximum power that can be delivered through a transmit circuit 650. To eliminate or reduce harmonics, the transmit circuitry 600 can include a filter circuit 626. The filter circuit 626 can be a three pole (capacitor 634, inductor 632, and capacitor 636) low pass filter circuit 626.

The signal output by the filter circuit 626 can be provided to a transmit circuit 650 comprising a coil 614. The transmit circuit 650 can include a series resonant circuit having a capacitance 620 and inductance that can resonate at a frequency of the filtered signal provided by the driver circuit 624. In various embodiments, the coil or an additional capacitor component can create the inductance or capacitance. The load of the transmit circuit 650 can be represented by the variable resistor 622. The load can be a function of a wireless power receiver 508 that is positioned to receive power from the transmit circuit 650.

In various embodiments, the wireless power transmission system 100, described above with respect to FIGS. 1-6, can vary a wireless power transmission based on detection of a nearby object. The nearby object can include an intended receiver, a device to be charged, and/or a foreign object. A foreign object can be something other than an intended transmission target (i.e., a non-charging device) such as, for example, a parasitic receiver, an inorganic object, or a living object (such as a human, animal, etc.). A parasitic receiver can include, for example, a non-electronic metallic object, an unauthorized chargeable device, etc.

For example, as discussed above with respect to FIG. 4, the transmitter 404 can include the presence detector 480, which can detect the presence, distance, orientation, and/or location of the nearby object. In various other embodiments, the presence detector 480 can be located in another location such as, for example, on the receiver 508, or elsewhere. The controller 415 can reduce transmission power when a foreign object is detected within a first distance. In various embodiments, the wireless power transmission system 100 can adjust a characteristic of the wireless power transmission in accordance with rules or regulations regarding biological safety, fire safety, etc. For example, the wireless power transmission system 100 can adjust the transmit power such that the electromagnetic field reaching a nearby human body is below a threshold, given the distance to the human body.

Referring back to FIG. 2, in certain embodiments, the wireless power transfer system 100 can include a plurality of receivers 208. In one embodiment, the size of the TX coil 214 is fixed. Accordingly, the transmitter 204 may not be well matched to different sized RX coils 218. For a variety of reasons, it can be desirable for the transmitter 204 to use a plurality of TX coils 214. In some embodiments, the plurality of TX coils 214 can be arranged in an array. In some embodiments, the array can be modular. In some embodiments, the array can include TX coils 214 of the same, or substantially the same, size.

In various embodiments, each TX coil 214 can be independently activated, based on the location of the receivers 208 and/or the size of their RX coils 218. For example, a single TX coil 214 can provide wireless power to nearby receivers 208 having relatively small RX coils 218. On the other hand, multiple TX coils 214 can be provide wireless power to nearby receivers having relatively large RX coils 218. TX coils 214 that are not near RX coils 218 can be deactivated.

In some embodiments, the plurality of TX coils 214 can form a large transmit area. The transmit area can be scalable, covering a larger area using additional TX coils 214. The TX coils 214 can allow for free positioning of devices over a large area. Moreover, they can be configured to simultaneously charge a plurality of receivers 208. In some embodiments, individual TX coils 214 can couple to each other. TX coils 214 that are coupled can result, for example, in one power amplifier driving power into an adjacent amplifier. Accordingly, coupled TX coils 214 can cause amplifier instability and/or damage. It can be desirable for the wireless power transfer system 100 to include methods, systems, and/or apparatuses for decoupling the TX coils 214.

Figure 7A:
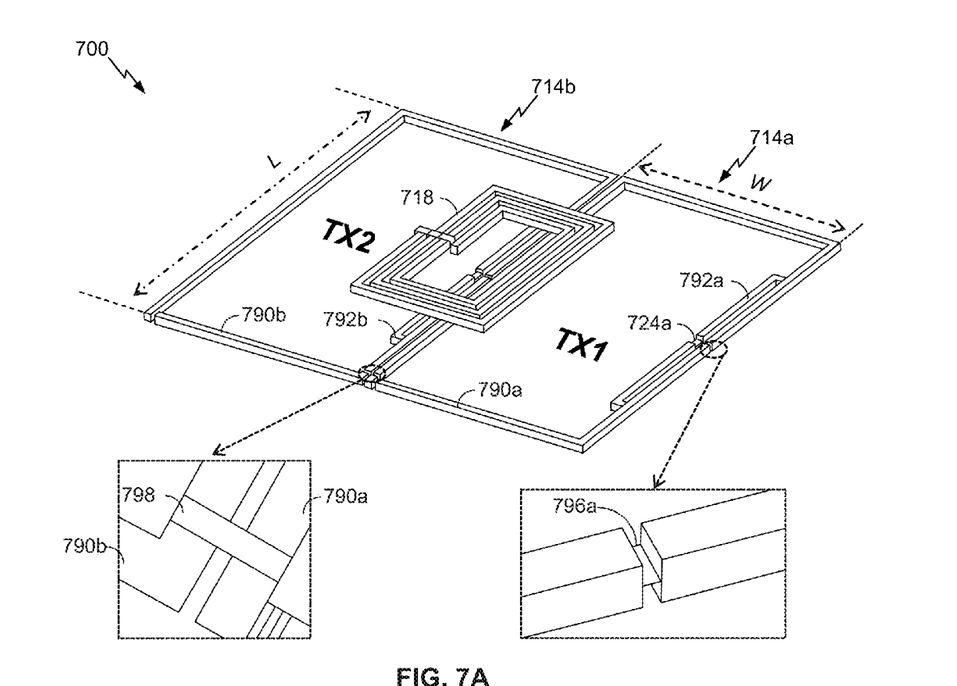
FIG. 7A is a perspective view of an exemplary transmit area, according to one embodiment.

FIG. 7A is a perspective view of an exemplary transmit area 700, according to one embodiment. As shown, the transmit area 700 includes a first TX coil 714a, a second TX coil 714b, and an RX coil 718. Although the illustrated transmit area 700 includes only two TX coils 714a-714b, a person having ordinary skill in the art will appreciate that additional TX coils can be included, and the transmit area 700 can extend beyond the area shown. Similarly, the transmit area 700 can include additional RX coils.

In the illustrated embodiment, each TX coil 714a-714b includes a driver coil 790a-790b, and a gamma loop 792a-792b. The gamma loops 792a-792b can transform the impedance of the driver coils 790a-790b to better match the source impedance of the transmitter. In various embodiments, the gamma loops 792a-792b can be omitted. In various embodiments, the TX coils 714a-714b can include one or more of the TX coils 214 (FIG. 2), 414 (FIG. 4), and 614 (FIG. 6). Accordingly, the TX coils 714a-714b can be driven by, for example, the driver 224 (FIG. 2), the PA 424 (FIG. 4), and/or the driver 624 (FIG. 6). In an embodiment, the TX coils 714a-714b can be driven by a voltage source power amplifier. In various embodiments, independent amplifiers can drive the TX coils 714a-714b, or a common amplifier can drive both TX coils 714a-714b.

In the illustrated embodiment, the TX coils 714a-714b are rectangular. In some embodiments, the TX coils 714a-714b can have a width W of about 50 mm-150 mm, such as about 90 mm. The TX coils 714a-714b can have a length L of about 100 mm-200 mm, such as about 160 mm. In some embodiments, the TX coils 714a-714b can be arrayed or tiled. The TX coils 714a-714b can have a separation S in the x direction (see FIG. 7C) of around 0.5 mm-1.5 mm, such as about 1 mm. The RX coil 718 can be raised above the TX coils 714a-714b in the y direction (see FIG. 7C) by around 5 mm-15 mm, such as around 10 mm. In some embodiments, the coils 714a-714b and/or 790a-790b can be other shapes such as triangular, hexagonal, etc. For example, tiled triangular shapes can minimize the number of neighbors for each coil 714a-714b.

The driver coils 790a-790b serve to couple the transmitter (for example, the transmitter 104 of FIG. 1) to the RX coil 718. In the illustrated embodiment, the driver coils 790a-790b are single-turn loops. In other embodiments, the driver coils 790a-790b can be multi-turn coils. The driver coils 790a-790b can include single-layer, high-Q coils. In some embodiments, the driver coils 790a-790b can have an inductance of around 200 nH-500 nH, such as around 328 nH or 403 nH. In some embodiments, the driver coils 790a-790b can have an impedance of around 40 mΩ-120 mΩ, such as 79.5 mΩ.

The gamma loops 792a-792b serve to invert the input impedance of the TX coils 714a-714b. As discussed above, the gamma loops 792a-792b can be driven by a voltage source power amplifier, such as a PA 724a. In the illustrated embodiment, the gamma loops 792a-792b are single-turn loops. The gamma loops 792a-792b can include single-layer, high-Q coils. In some embodiments, the gamma loops 792a-792b can have an inductance of around 20 nH-160 nH, such as around 40 nH or 115 nH. In some embodiments, the driver coils 790a-790b can have an impedance of around 25 mΩ-65 mΩ, such as around 45 mΩ.

In the illustrated embodiment, the gamma loops 792a-792b couple to the driver coils 790a-790b. In various embodiments embodiment, the gamma loops 792a-792b can share one or more common reactance elements with the driver coils 790a-790b. The reactance elements can be passive or active. In the illustrated embodiment, the gamma loop 792a shares a common inductor 796a with the driver coil 790a. The common inductor 796a serves to increase the mutual inductance between the gamma loop 792a and the driver coil 790a. In various embodiments, the common inductor 796a can be around 50 nH-100 nH, such as around 75 nH.

As discussed above, the TX coils 714a-714b can couple to each other. For example, mutual inductance between adjacent elements of the driver coils 790a-790b can be particularly strong. In various embodiments, one or more parts of the TX coils 714a-714b can share one or more common reactance elements. In embodiments including additional TX coils (for example, a large array of TX coils), one or more TX coils can share one or more common reactance elements with one or more other TX coils. The reactance elements can be configured to at least partially decouple the TX coils, for example, magnetically decoupling the TX coils 714a and 714b by canceling a mutual inductance between the TX coils 714a and 714b. The reactance elements can be passive or active. In the illustrated embodiment, the driver coils 790a-790b share a common capacitor 798.

The common capacitor 798 serves to reduce or eliminate the mutual inductance between the driver coils 790a-790b. In various embodiments, the common capacitor 798 can be around 5 nF-15 nF, such as around 10 nF. In an embodiment, the mutual inductance between the TX coils 714a-714b can be measured or calculated at a first frequency (such as, for example, 6.78 MHz), and the common capacitor 798 can be set to cancel out the measured or calculated mutual inductance.

The RX coil 718 receives wireless power from the TX coils 714a-714b. In the illustrated embodiment, the RX coil 718 is a four-turn coil. In some embodiments, the RX coil 718 can have an inductance of around 500 nH-900 nH, such as around 683 nH. In some embodiments, the RX coil 718 can have an impedance of around 100 mΩ-300 mΩ, such as around 166.5 mΩ.

Figure 7B:
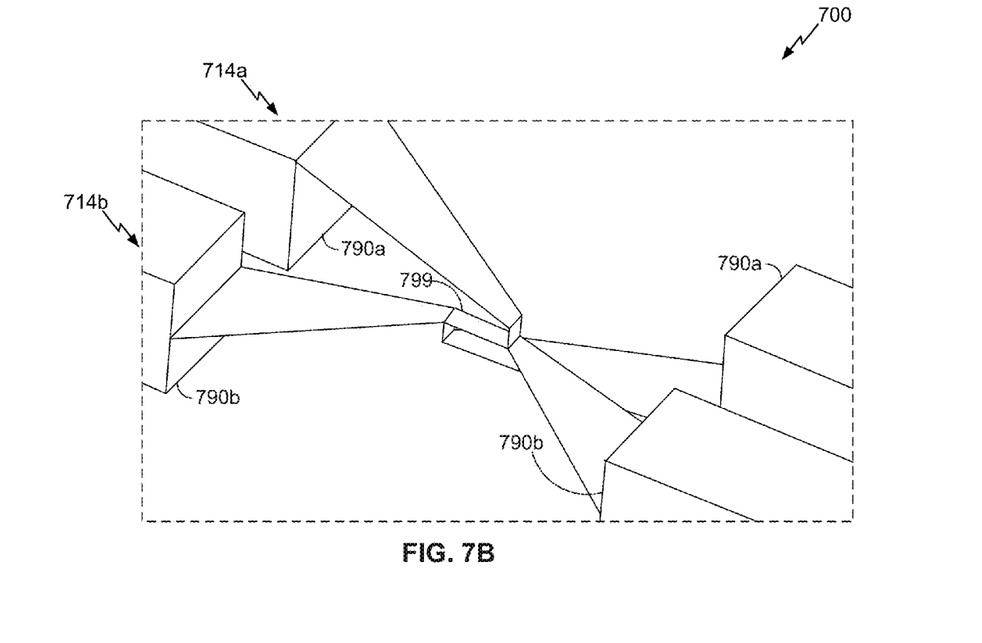
FIG. 7B is a perspective view of a portion of the exemplary transmit area of FIG. 7A, according to another embodiment.

FIG. 7B is a perspective view of a portion of the exemplary transmit area 700 of FIG. 7A, according to another embodiment. As shown, the transmit area 700 includes the first TX coil 714a, the second TX coil 714b, and the RX coil 718. In the illustrated embodiment of FIG. 7B, the driver coils 790a-790b share a common inductor 799, instead of the common capacitor 798 shown in FIG. 7A. The common inductor 799 is cross-connected between the driver coils 790a-790b. The common inductor 799 serves to reduce or eliminate the mutual inductance between the driver coil 790a and the driver coil 790b. In various embodiments, the common inductor 799 can be around 25 nH-75 nH, such as around 50 nH. In an embodiment, the mutual inductance between the TX coils 714a-714b can be measured or calculated at a first frequency (such as, for example, 6.78 MHz), and the common inductor 799 can be set equal to the measured or calculated mutual inductance.

Figure 7C:
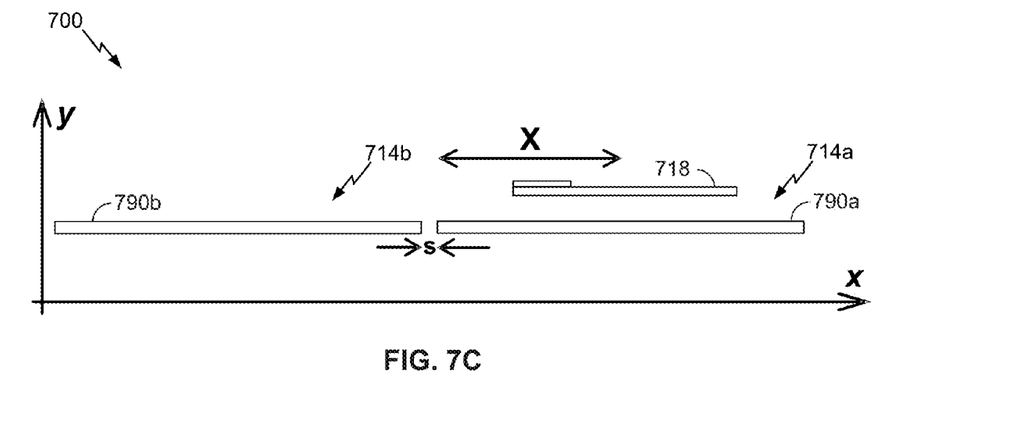
FIG. 7C is an end view of the exemplary transmit area of FIG. 7A, according to one embodiment.

FIG. 7C is an end view of the exemplary transmit area 700 of FIG. 7A, according to one embodiment. As shown, the transmit area 700 includes the first TX coil 714a, the second TX coil 714b, and the RX coil 718. As discussed above, the TX coils 714a-714b can have a separation S in the x direction of around 0.5 mm-1.5 mm, such as about 1 mm, and the RX coil 718 can be raised above the TX coils 714a-714b in the y direction by around 5 mm-15 mm, such as around 10 mm. In an embodiment, the total mutual inductance between the RX coil 718 and the TX coils 714a-714b will vary at each position X of the RX coil 718.

Figure 8:
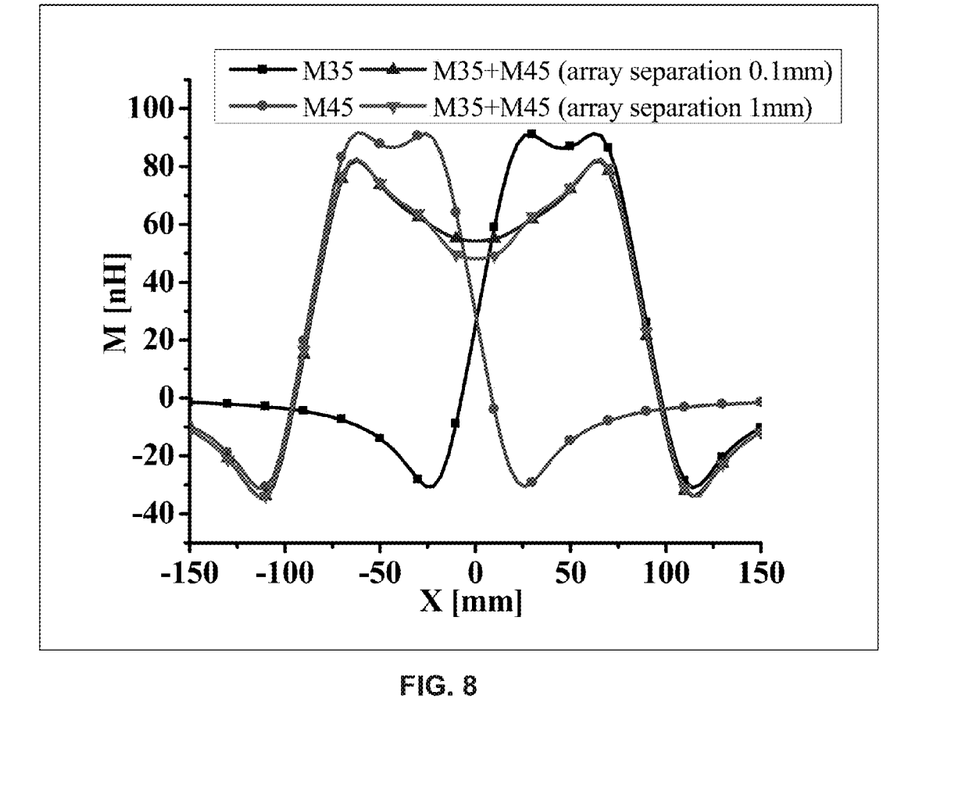
FIG. 8 is a graph showing the mutual inductance between an RX coil and TX coils of FIG. 7C, according to an embodiment.

FIG. 8 is a graph showing the mutual inductance between the RX coil 718 and the TX coils 714a-714b of FIG. 7C, according to an embodiment. The x-axis shows the position X (in mm), along the x direction, of the RX coil 718 (see FIG. 7). The y-axis shows the mutual inductance (in nH) between the RX coil 718 and the TX coils 714a-714b, for each position X. The mutual inductance is shown for M35 (the inductance between the RX coil 718 and the TX coil 714a), M45 (the inductance between the RX coil 718 and the TX coil 714b), and the total mutual inductance (i.e., the sums of M35 and M45) for array separations S of 0.1 mm and 1 mm.

As shown in FIG. 8, the mutual inductance between the RX coil 718 and the TX coil 714b (M45) drops off as the RX coil 718 moves father away from the TX coil 714b (for example, from X=−25 mm to X=25 mm). Similarly, the mutual inductance between the RX coil 718 and the TX coil 714a (M35) increases as the RX coil 718 moves closer to the TX coil 714a (for example, from X=−25 mm to X=25 mm). The total mutual inductance between the RX coil 718 and the TX coils 714*a*-714*b* dips when the RX coil 718 is between the TX coils 714*a*-714*b* (for example, from X=−75 mm to X=75 mm).

In an embodiment, the transmitter 204 (FIG. 2) can disable the TX coil 714*b* when the RX coil 718 moves into a position X where the mutual inductance between the RX coil 718 and the TX coil 714*b* (M45) becomes negative (for example, around X=10 mm), and particularly where M45 is minimum (for example, around X=25 mm). In another embodiment, the transmitter 204 (FIG. 2) can reverse the phase of the TX coil 714*b* when the RX coil 718 moves into a position X where the mutual inductance between the RX coil 718 and the TX coil 714*b* (M45) becomes negative (for example, around X=10 mm), and particularly where M45 is minimum (for example, around X=25 mm). Accordingly, the total mutual inductance between the RX coil 718 and the TX coils 714*a*-714*b* can be increased.

Similarly, the transmitter 204 (FIG. 2) can enable the TX coil 714*a* when the RX coil 718 moves into a position X where the mutual inductance between the RX coil 718 and the TX coil 714*a* (M35) becomes positive (for example, around X=−10 mm). In another embodiment, where the phase of the TX coil 714*a* is already reversed, the transmitter 204 (FIG. 2) can reverse the phase of the TX coil 714*a* when the RX coil 718 moves into a position X where the mutual inductance between the RX coil 718 and the TX coil 714*a* (M35) becomes positive (for example, around X=−10 mm). Accordingly, the total mutual inductance between the RX coil 718 and the TX coils 714*a*-714*b* can be increased.

Figure 9:
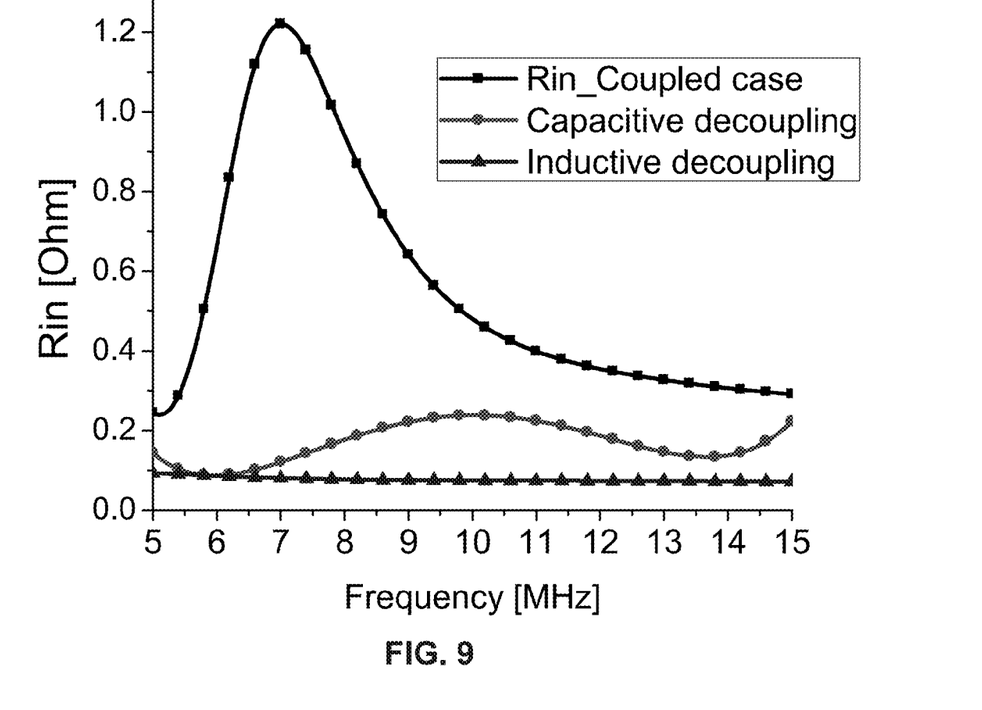
FIG. 9 is a graph showing the input impedance into the TX coils of FIGS. 7A-C, according to various embodiments.

FIG. 9 is a graph showing the input impedance into the TX coils 714*a* of FIGS. 7A-C, according to various embodiments. The x-axis shows the transmit frequency, in MHz. The y-axis shows the input impedance (Rin), in $\Omega$, at the TX coil 714*a* while the TX coil 714*b* is loaded with a 5 $\chi$ load. The input impedance (Rin) is shown for the embodiment of FIG. 7A where the TX coils 714*a*-714*b* share the common capacitor 798 ("capacitive decoupling"), the embodiment of FIG. 7B where the TX coils 714*a*-714*b* share the common inductor 799 ("inductive decoupling"), and another embodiment ("Rin Coupled case") where the TX coils 714*a*-714*b* do not share a common reactive element.

As shown in FIG. 9, the input impedance (Rin) is higher in the Rin Coupled case, where the TX coils 714*a*-714*b* do not share a common reactive element, such as the common capacitor 798 or the common inductor 799. As shown, capacitive decoupling provides narrow-band decoupling, with lower input impedance. In some embodiments, capacitive decoupling can provide high-Q and lower loss than inductive coupling. As shown, inductive decoupling provides broadband decoupling. In some embodiments, inductive coupling can create higher loss than capacitive decoupling.

Figure 10A:
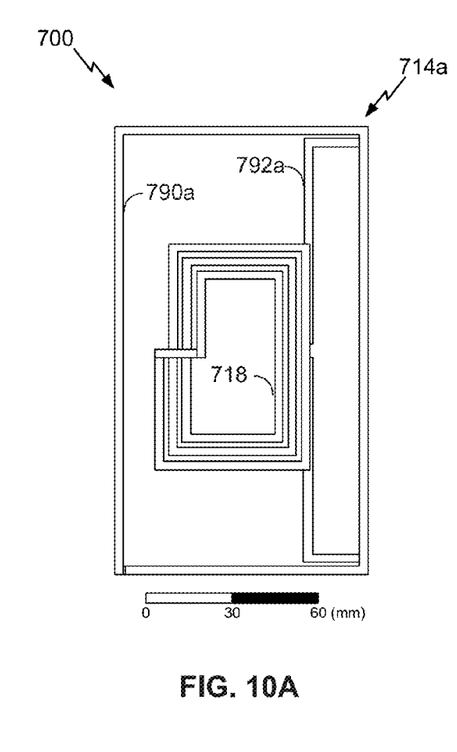
FIGS. 10A-10C are plan views of a portion of the exemplary transmit area of FIG. 7A, according to various embodiments.
Figure 10B:
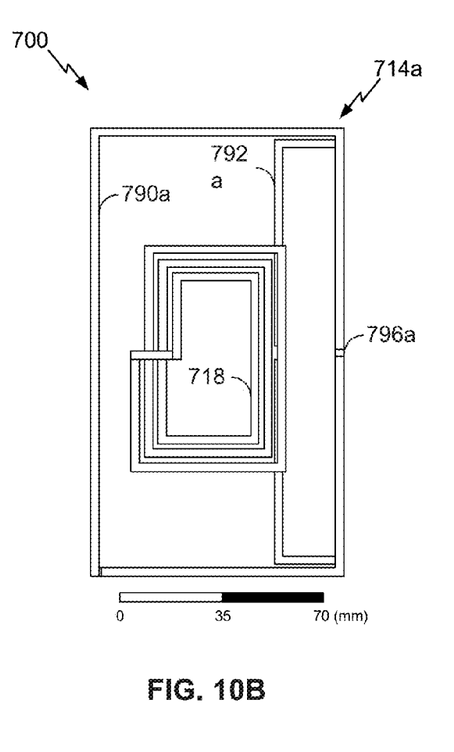
Figure 10C:
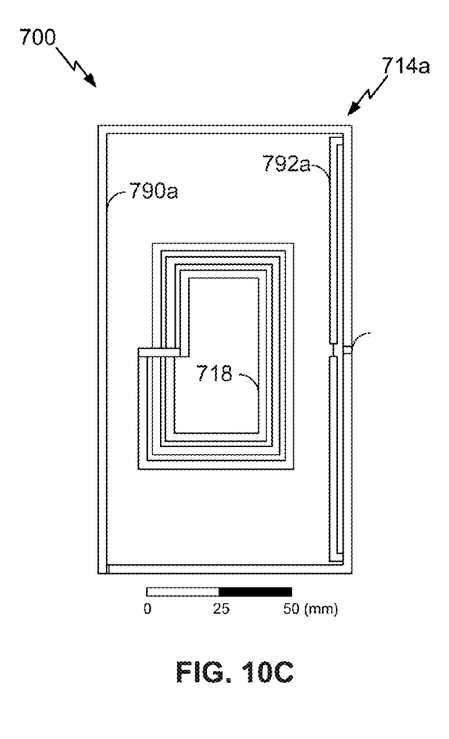

FIGS. 10A-10C are plan views of a portion of the exemplary transmit area 700 of FIG. 7A, according to various embodiments. The illustrated portion of the transmit area 700 includes the first TX coil 714*a* and an RX coil 718. The first TX coil 714*a* includes the driver coil 790*a*, and the gamma loop 792*a*. The gamma loop 792*a* is configured differently in the embodiments of FIGS. 10A-10C.

In the illustrated embodiment of FIG. 10A, the gamma loop 792*a* does not include the common inductor 796*a*, shown in FIGS. 10B-10C. The mutual inductance between the gamma loop 792*a* and the driver coil 790*a* is around 50 nH-150 nH, such as 94 nH. The mutual inductance between the gamma loop and the RX coil 718 is around 10 nH-20 nH, such as 15 nH. The mutual inductance between the driver coil 790*a* and the RX coil 718 is around 50 nH-150 nH, such as 87 nH.

In the illustrated embodiment of FIG. 10B, the gamma loop 792*a* includes the common inductor 796*a*. The common inductor 796*a* can be around 25 nH-75 nH, such as around 50 nH. The mutual inductance between the gamma loop 792*a* and the driver coil 790*a* is around 100 nH-200 nH, such as around 144 nH. The mutual inductance between the gamma loop and the RX coil 718 is around 10 nH-20 nH, such as around 15 nH. The mutual inductance between the driver coil 790*a* and the RX coil 718 is around 50 nH-150 nH, such as around 87 nH. Accordingly, the common inductor 796*a* can increase the mutual inductance between the gamma loop 792*a* and the driver coil 790*a* compared to the embodiment of FIG. 10A where the gamma loop 792*a* does not include the common inductor 796*a*.

In the illustrated embodiment of FIG. 10C, the gamma loop 792*a* includes the common inductor 796*a*. The common inductor 796*a* can be around 75 nH-150 nH, such as around 110 nH. Moreover, the gamma loop 792*a* shown in FIG. 10C is smaller than that shown in FIGS. 10A-10B. The mutual inductance between the gamma loop 792*a* and the driver coil 790*a* is around 100 nH-200 nH, such as around 144 nH. The mutual inductance between the gamma loop and the RX coil 718 is around 1 nH-3 nH, such as around 2 nH. The mutual inductance between the driver coil 790*a* and the RX coil 718 is around 50 nH-150 nH, such as around 87 nH. Accordingly, the common inductor 796*a* can increase the mutual inductance between the gamma loop 792*a* and the driver coil 790*a* compared to the embodiment of FIG. 10A where the gamma loop 792*a* does not include the common inductor 796*a*. Moreover, the smaller gamma loop 792*a* shown in FIG. 10C can reduce the mutual inductance between the gamma loop and the RX coil 718 compared to the embodiments of FIGS. 10A-10B.

Figure 11:
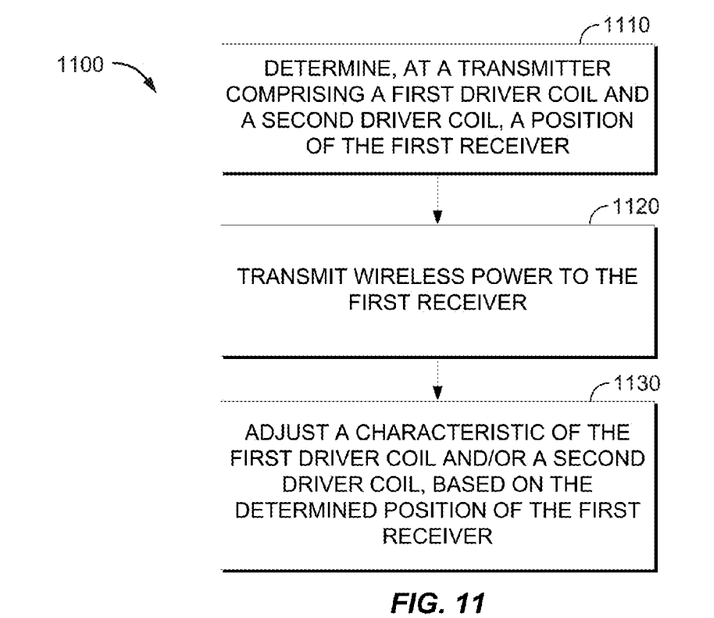
FIG. 11 is a flowchart of an exemplary method of wireless power transmission.

FIG. 11 is a flowchart 1100 of an exemplary method of wireless power transmission. Although the method of flowchart 1100 is described herein with reference to the wireless power transmission system 100 discussed above with respect to FIGS. 1-2, the transmitter 404 discussed above with respect to FIG. 4, and the transmit area 700 discussed above with respect to FIGS. 7A-7C, a person having ordinary skill in the art will appreciate that the method of flowchart 1100 can be implemented by another device described herein, or any other suitable device. In an embodiment, the steps in flowchart 1100 can be performed by a processor or controller such as, for example, the controller 415 (FIG. 4) and/or the processor-signaling controller 516 (FIG. 5). Although the method of flowchart 1100 is described herein with reference to a particular order, in various embodiments, blocks herein can be performed in a different order, or omitted, and additional blocks can be added.

First, at block 1110, the presence detection system 480 (FIG. 4) determines a position of the RX coil 718 (FIG. 7). The presence detector 480 can determine a position of the RX coil 718 by detecting a characteristic of the transmit coil 414. For example, the presence detector 480 can detect a change in impedance at a transmit coil 414 when the RX coil 718 is near. In another embodiment, the presence detector 480 can detect the position of the RX coil 718 using one or more sensors (not shown).

Next, at block 1120, the transmitter 406 transmits wireless power to the RX coil 718. The transmitter 406 can transmit wireless power via the TX coil 214. In other embodiments, the transmitter 406 can transmit wireless power via one or more of the TX coil 214, 414, 714*a* and 714*b*. One or more TX coils can be decoupled via one or more common reactance elements. For example, the TX coils 714*a*-714*b* can be decoupled via the common capacitor 798 and/or the common inductor 799, discussed above with respect to FIGS. 7A and 7B, respectively.

Then, at block 1130, the controller 415 adjusts a characteristic of the first driver coil 790a and/or the second driver coil 790b. The controller 415 adjusts the characteristic of the driver coils 790a-790b based on the detected position of the RX coil 718. In an embodiment, the characteristic can include a transmit power and/or the phase of the TX coils 714a-714b. In various embodiments, the controller 415 can determine the position of multiple receivers, and can adjust characteristics of a plurality of TX coils (for example, an array of TX coils), each of which can be decoupled from their neighbors via a common reactance element.

Figure 12:
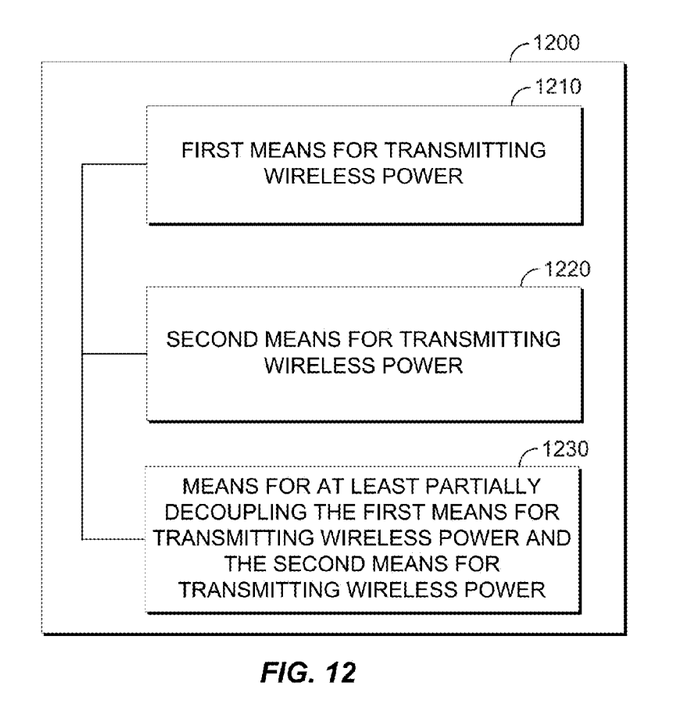
FIG. 12 is a functional block diagram of a system for wireless power transmission, in accordance with an exemplary embodiment of the invention.

FIG. 12 is a functional block diagram of a system for wireless power transmission 1200, in accordance with an exemplary embodiment of the invention. The system for wireless power transmission 1200 comprises first means 1210 for transmitting wireless power, second means 1220 for transmitting wireless power, and means 1230 for at least partially decoupling the first means 1210 for transmitting wireless power and the second means 1220 for transmitting wireless power.

In an embodiment, the first means 1210 for transmitting wireless power can be configured to perform one or more of the functions described above with respect to block 1120 (FIG. 11). In various embodiments, the first means 1210 for transmitting wireless power can be implemented by one or more of the TX coils 214 (FIG. 2), 414 (FIG. 4), 614 (FIG. 6), and 714a-714b (FIG. 7A), the driver 224 (FIG. 2) and 624 (FIG. 6), and the PA 424 (FIG. 4).

The second means 1210 for transmitting wireless power can be configured to perform one or more of the functions described above with respect to block 1120 (FIG. 11). In various embodiments, the second means 1210 for transmitting wireless power can be implemented by one or more of the TX coils 214 (FIG. 2), 414 (FIG. 4), 614 (FIG. 6), and 714a-714b (FIG. 7A), the driver 224 (FIG. 2) and 624 (FIG. 6), and the PA 424 (FIG. 4).

The means 1230 for at least partially decoupling the first means 1210 for transmitting wireless power and the second means 1220 for transmitting wireless power can be implemented by a common reactance element such as, for example, one or more of the common capacitor 798 (FIG. 7A) and the common inductor 799 (FIG. 7B).

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC. The ASIC can reside in a user terminal. In the alternative, the processor and the storage medium can reside as discrete components in a user terminal.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device configured to transmit wireless power to a first receiver, comprising:
   a first driver coil;
   a second driver coil; and
   a common reactance element connected to the first driver coil and the second driver coil, configured to at least partially cancel mutual inductance between the first driver coil and the second driver coil.

2. The device of claim 1, wherein the common reactance element comprises a passive reactance element.

3. The device of claim 1, wherein the common reactance element comprises a capacitor bridging the first driver coil and the second driver coil.

4. The device of claim 1, wherein the common reactance element comprises an inductor cross-connecting the first driver coil and the second driver coil.

5. The device of claim 1, further comprising a gamma loop configured to invert the input impedance of the first driver coil.

6. The device of claim 5, further comprising an inductor common to the first driver coil and the gamma loop, configured to increase the mutual inductance between the first driver coil and the gamma loop.

7. The device of claim 1, further comprising a controller configured to selectively adjust a characteristic of the first driver coil and/or the second driver coil.

8. The device of claim 7, wherein the controller is further configured to determine a position of the first receiver, and to selectively adjust a characteristic of the first driver coil and the second driver coil based on the determined position of the first receiver.

9. The device of claim 8, wherein the adjusted characteristic comprises one of a transmit power and a phase.

10. The device of claim 1, further comprising:
    one or more additional driver coils; and
    one or more additional reactance elements,
    wherein the reactance elements are configured to at least partially cancel mutual inductance between neighboring driver coils.

11. A method of transmitting wireless power to a first receiver, comprising:
    determining, at a transmitter comprising a first driver coil and a second driver coil, a position of the first receiver;
    transmitting wireless power to the first receiver; and
    adjusting a characteristic of the first driver coil and/or a second driver coil, based on the determined position of the first receiver,
    wherein the transmitter further comprises a common reactance element connected to the first driver coil and the second driver coil, configured to at least partially cancel mutual inductance between the first driver coil and the second driver coil.

12. The method of claim 11, wherein the common reactance element comprises a passive reactance element.

13. The method of claim 11, wherein the common reactance element comprises a capacitor bridging the first driver coil and the second driver coil.

14. The method of claim 11, wherein the common reactance element comprises an inductor cross-connecting the first driver coil and the second driver coil.

15. The method of claim 11, wherein the transmitter further comprises a gamma loop configured to invert the input impedance of the first driver coil.

16. The method of claim 11, wherein the transmitter further comprises an inductor common to the first driver coil and the gamma loop, configured to increase the mutual inductance between the first driver coil and the gamma loop.

17. The method of claim 11, wherein the adjusted characteristic comprises one of a transmit power and a phase.

18. The method of claim 11, wherein the transmitter further comprises:
    one or more additional driver coils; and
    one or more additional reactance elements,
    wherein the reactance elements are configured to at least partially cancel mutual inductance between neighboring driver coils.

19. The method of claim 11, wherein the common reactance element comprises an active reactance element, the method further comprising adjusting a capacitance and/or inductance of the reactance element.

20. The method of claim 11, further comprising:
    determining a position of a second receiver;
    simultaneously transmitting wireless power to the first and second receiver; and
    adjusting a characteristic of at least one driver coil, based on the determined position of the second receiver.

21. An apparatus for transmitting wireless power to a first receiver, comprising:
    first means for transmitting wireless power;
    second means for transmitting wireless power; and
    means for at least partially decoupling the first means for transmitting wireless power and the second means for transmitting wireless power.

22. The apparatus of claim 21, further comprising means for inverting the input impedance of the first means for transmitting wireless power.

23. The apparatus of claim 22, further comprising means for increasing the mutual inductance between the first means for transmitting wireless power, and the means for inverting the input impedance of the first means for transmitting wireless power.

24. The apparatus of claim 21, further comprising means for selectively adjusting a characteristic of the first means for transmitting wireless power and/or the second means for transmitting wireless power.

25. The apparatus of claim 24, further comprising means for determining a position of the first receiver, and means for selectively adjusting a characteristic of the first driver coil and the second driver coil based on the determined position of the first receiver.

26. The apparatus of claim 25, wherein the adjusted characteristic comprises a transmit power.

27. The apparatus of claim 25, wherein the adjusted characteristic comprises a phase.

28. The apparatus of claim 21, further comprising:
    one or more additional means for transmitting wireless power; and
    one or more means for decoupling neighboring means for transmitting wireless power.

29. The apparatus of claim 21, further comprising:
    means for a position of the first receiver; and
    means for adjusting a characteristic of the first means for transmitting wireless power and/or the second means for transmitting wireless power, based on the determined position of the first receiver.

30. The apparatus of claim 29, further comprising:
    means for determining a position of a second receiver;
    means for simultaneously transmitting wireless power to the first and second receiver; and
    means for adjusting a characteristic of at least one driver coil, based on the determined position of the second receiver.

31. A non-transitory computer-readable medium comprising code that, when executed, causes an apparatus to:
- transmit wireless power, from a transmitter comprising a first driver coil and a second driver coil, to a first receiver
- determine a position of the first receiver; and
- adjust a characteristic of the first driver coil and/or a second driver coil, based on the determined position of the first receiver,
- wherein the transmitter further comprises a common reactance element connected to the first driver coil and the second driver coil, configured to at least partially cancel mutual inductance between the first driver coil and the second driver coil.

32. The medium of claim 31, wherein the common reactance element comprises a passive reactance element.

33. The medium of claim 31, wherein the common reactance element comprises a capacitor bridging the first driver coil and the second driver coil.

34. The medium of claim 31, wherein the common reactance element comprises an inductor cross-connecting the first driver coil and the second driver coil.

35. The medium of claim 31, wherein the transmitter further comprises a gamma loop configured to invert the input impedance of the first driver coil.

36. The medium of claim 31, wherein the transmitter further comprises an inductor common to the first driver coil and the gamma loop, configured to increase the mutual inductance between the first driver coil and the gamma loop.

37. The medium of claim 31, wherein the adjusted characteristic comprises one of a transmit power and a phase.

38. The medium of claim 31, wherein the transmitter further comprises:
- one or more additional driver coils; and
- one or more additional reactance elements,
- wherein the reactance elements are configured to at least partially cancel mutual inductance between neighboring driver coils.

39. The medium of claim 31, wherein the common reactance element comprises an active reactance element, the medium further comprising adjusting a capacitance and/or inductance of the reactance element.

40. The medium of claim 31, further comprising code that, when executed, causes the apparatus to:
- determine a position of a second receiver;
- simultaneously transmit wireless power to the first and second receiver; and
- adjust a characteristic of at least one driver coil, based on the determined position of the second receiver.

* * * * *